United States Patent Office 3,080,380
Patented Mar. 5, 1963

3,080,380
17-OXYGENATED 6-OXAANDROSTAN-7-ONES AND DERIVATIVES THEREOF
Norman W. Atwater, Arlington Heights, Ill., assignor to G. D. Searle & Co., Chicago, Ill., a corporation of Delaware
No Drawing. Filed Dec. 6, 1960, Ser. No. 73,961
15 Claims. (Cl. 260—343.2)

The present invention is concerned with novel steroidal lactones and derivatives thereof, as represented by the structural formula

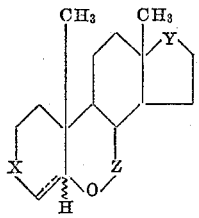

wherein X is a member of the class comprising methylene, carbonyl, β-hydroxymethylene, and β-(lower alkanoyl)oxymethylene radicals; Y is a carbonyl, β-hydroxymethylene, β-(lower alkanoyl)oxymethylene, β-benzoyloxymethylene, or β-cyclohexanecarbonyloxymethylene radical; Z is a carbonyl, β-hydroxymethylene, β-(lower alkanoyl)oxymethylene, or β-(lower alkoxy)methylene radical; the wavy line indicates that the configuration at carbon 5 can be either α or β; and the dotted line indicates the optional presence of a doubly-bonded linkage between carbon atoms 4 and 5.

The lower alkanoyl groups encompassed in the representation supra are, typically, formyl, acetyl, propionyl, butyryl, valeryl, caproyl, and the branched-chain isomers thereof, which are derived from alkanoic acids containing fewer than 7 carbon atoms.

Examples of lower alkoxy radicals represented in the Z term supra are methoxy, ethoxy, propoxy, butoxy, pentyloxy, hexyloxy, and the branched-chain isomers thereof. This application is a continuation-in-part of my copending application Serial No. 850,786, filed November 4, 1959, now abandoned.

The 6-oxa compounds of this invention are suitably manufactured by treating the corresponding 5-oxo-5,7-seco-B-norandrostane derivatives with a reducing agent such as sodium borohydride. The 5,7-seco intermediates are obtained from the corresponding androst-5-enes by treatment first with an oxidizing agent such as sodium chromate to produce the corresponding 7-keto-androst-5-ene, followed by cleavage of the double bond by means of successive treatment with ozone and hydrogen peroxide. These processes are specifically illustrated by the reaction of 17β-benzoyloxyandrost-5-en-3β-ol 3-acetate in acetic acid and acetic anhydride with sodium chromate to afford 3β-acetoxy-17β-benzoyloxyandrost-5-en-7-one, followed by treatment of the latter substance in methylene chloride and methanol with ozone, then with hydrogen peroxide to produce methyl 3β-acetoxy-17β-benzoyloxy-5-oxo-5,7-seco-B-norandrostan-7-oate, and reduction of this compound in ethanol with sodium borohydride to yield 17β-benzoyloxy-6-oxa-5β-androstan-7-one, 3β-acetoxy-17β-benzoyloxy-6-oxa-5β-androstan-7-one, 17β-benzoyloxy-6-oxa-5α-androstan-7β-ol, 3β-acetoxy-17β-benzoyloxy-6-oxa-5α-androstan-7β-ol, 3β-acetoxy-17β-benzoyloxy-6-oxa-5β-androstan-7β-ol, 17β-benzoyloxy-3β-hydroxy-6-oxa-5β-androstan-7-one, and 17β-benzoyloxy-6-oxa-5α-androstane-3β,7β-diol.

The compounds of this invention are useful as a result of their valuable pharmacological properties. They are, for example, anti-hormonal agents as evidenced by their ability to inhibit the typical androgenic response produced by the administration of testosterone, and also the uterine changes resulting from the administration of progesterone.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (°C.). Quantities of materials are expressed in parts by weight unless otherwise noted.

Example 1

To a mixture of 23 parts of 17β-benzoyloxyandrost-5-en-3β-ol 3-acetate, 180 parts of acetic acid, and 105 parts of acetic anhydride is added 15.9 parts of anhydrous sodium chromate, and the system is stirred for about 5 days at about 35–45°, then poured into ice water. The resulting precipitate is collected by filtration, then extracted with ethyl acetate, and the organic extract is washed successively with water and aqueous sodium carbonate, dried over anhydrous sodium sulfate, then concentrated to dryness in vacuo. Crystallization of the residue from methanol affords 3β-acetoxy-17β-benzoyloxyandrost-5-en-7-one, M.P. about 203–204°.

A solution of 50 parts of 3β-acetoxy-17β-benzoyloxyandrost-5-en-7-one in 1150 parts of methylene chloride containing 330 parts of methanol is treated at —78° with a stream of oxygen containing ozone, until a pale blue color persists. After the reaction mixture is allowed to warm to about 20°, 10 parts of 30% aqueous hydrogen peroxide and 20 parts of water are added, and this mixture is stored at room temperature for about 16 hours. Approximately 660 parts of methylene chloride is added, and the organic layer is washed successively with water and aqueous potassium carbonate, then evaporated to dryness at reduced pressure. The resuing residue is crystallized from isopropyl alcohol, then recrystallized from methanol to produce pure methyl 3β-acetoxy-17β-benzoyloxy-5-oxo-5,7-seco-B-norandrostan-7-otae, M.P. about 170.5–172.5°.

Example 2

To a solution of 15 parts of methyl 3β-acetoxy-17β-benzoyloxy-5-oxo-5,7-seco-B-norandrostan-7-oate in 230 parts of dioxane is added a solution of 8.6 parts of potassium hydroxide in 150 parts of water and 370 parts of dioxane, and this reaction mixture is stirred at room temperature for about 20 minutes, then poured into water. The precipitate which forms is collected by filtration, washed with water, and crystallized from aqueous acetone to yield pure methyl 17β-benzoyloxy-5-oxo-5,7-seco-B-norandrost-3-en-7-oate, M.P. about 147–149°.

Example 3

A mixture of 2 parts of methyl 17β-benzoyloxy-5-oxo-5,7-seco-B-norandrost-3-en-7-oate, 0.2 part of 5% palladium-on-carbon catalyst, and 100 parts of methanol is shaken in a hydrogen atmosphere until one molecular equivalent of hydrogen is absorbed. Removal of the catalyst by filtration affords a solution, which is concentrated to a small volume, then cooled to promote crystallization of methyl 17β-benzoyloxy-5-oxo-5,7-seco-B-norandrostan-7-oate, M.P. about 170–171°.

To a solution of 1.1 parts of methyl 17β-benzoyloxy-5-oxo-5,7-seco-B-norandrostan-7-oate in 90 parts of methanol is added a solution of 3 parts of potassium hydroxide and 10 parts of water, and this reaction mixture is heated at reflux for about 4 hours, cooled, neutralized with dilute hydrochloric acid, diluted with water, then extracted with methylene chloride. The organic solution is washed with water and concentrated to dryness in vacuo. Crystallization of the residue from isopropyl ether affords pure 17β-hydroxy-5-oxo-5,7-seco-B-norandrostan-7-oic acid, M.P. about 228.5–230.5°.

Example 4

To a solution of 4.6 parts of methyl 3β-acetoxy-17β-benzoyloxy-5-oxo-5,7-seco-B-norandrostan-7-oate in 500 parts of ethanol is added 2 parts of sodium borohydride in 80 parts of ethanol, and the mixture is allowed to stand at room temperature for about 6 hours. Acetic acid is added to destroy the unreacted reducing agent, and this mixture is concentrated to effect crystallization of the product, which is collected by filtration, washed with water, and adsorbed on a silica gel chromatographic column. The column is eluted with benzene solutions containing increasing proportions of ethyl acetate. The 5% ethyl acetate in benzene eluate affords a fraction, which is recrystalilzed from methanol to yield 17β-benzoyloxy-6-oxa-5β-androstan-7-one, M.P. about 198–201°.

The column is further eluted with 7% ethyl acetate in benzene to afford a mixture, which is separated by fractional crystallization from methanol to produce 3β-acetoxy-17β-benzoyloxy-6-oxa-5β-androstan-7-one, M.P. about 224–225.5°, and 17β-benzoyloxy-6-oxa-5α-androstan-7β-ol, M.P. about 166–169°.

The 10% ethyl acetate in benzene eluate yields a fraction, which is recrystallized from ethanol to afford 3β-acetoxy-17β-benzoyloxy-6-oxa-5α-androstan-7β-ol, M.P. about 201–202°.

Elution with 12% ethyl acetate in benzene and recrystallization from acetone results in 3β-acetoxy-17β-benzoyloxy-6-oxa-5β-androstan-7β-ol, M.P. about 228–233°.

The 45% ethyl acetate in benzene eluate yields a fraction, which is recrystallized from acetone-isopropyl ether to produce 17β-benzoyloxy-3β-hydroxy-6-oxa-5β-androstan-7-one, M.P. about 233–236°.

Elution of the column with ethyl acetate alone results in a fraction, which is recrystallized from ethyl acetate to afford 17β-benzoyloxy-6-oxa-5α-androstane-3β,7β-diol, M.P. about 254–257.5°.

Example 5

To a solution of 1.72 parts of 17β-benzoyloxy-6-oxa-5β-androstan-7-one in 60 parts of methanol is added a solution of 3 parts of sodium hydroxide and 15 parts of water, and the mixture is heated at reflux for about 4 hours, diluted with water, neutralized with hydrochloric acid, and stripped of solvent at reduced pressure. The resulting precipitate is collected by filtration and crystallized from isopropyl ether to afford pure 17β-hydroxy-6-oxa-5β-androstan-7-one, which displays a double melting point at about 149° and 161–162.5°.

Example 6

To a solution of 2 parts of 17β-hydroxy-6-oxa-5β-androstan-7-one in 100 parts of acetone is added aqueous 6 N chromic acid dropwise until an excess of the oxidizing agent is present. Approximately one minute later, 2 parts of isopropyl alcohol and about 900 parts of cold water are successively added, and the resulting precipitate is collected by filtration and dried to yield 6-oxa-5β-androstane-7,17-dione, M.P. about 161.5–162.5°.

Example 7

A mixture of 7 parts of 17β-hydroxy-5-oxo-5,7-seco-B-norandrostan-7-oic acid, 50 parts of acetic anhydride, and 0.5 part of anhydrous sodium acetate is heated at reflux for about 3½ hours, then evaporated to dryness in vacuo. Crystallization of the residue from isopropyl ether results in pure 17β-acetoxy-6-oxaandrost-4-en-7-one, M.P. about 151.5–152.5°.

Example 8

A mixture of 1.3 parts of 17β-benzoyloxy-3β-hydroxy-6-oxa-5β-androstan-7-one, 2 parts of platinum oxide, 1 part of 60% perchloric acid, and 200 parts of ethanol is shaken with hydrogen at one atmosphere pressure until the uptake of hydrogen ceases. The catalyst is removed by filtration, and the filtrate is diluted with water, then extracted with benzene. The organic layer is washed successively with aqueous sodium bicarbonate and water, then is concentrated to dryness at reduced pressure. Crystallization of the residue from acetone-isopropyl ether results in 17β-cyclohexanecarbonyloxy-3β-hydroxy-6-oxa-5β-androstan-7-one, M.P. about 199–200°. It displays maxima in the infrared at about 2.73, 5.77, 7.98, and 8.49 microns.

Example 9

To a solution of one part of 17β-cyclohexanecarbonyloxy-3β-hydroxy-6-oxa-5β-androstan-7-one in 40 parts of acetone is added dropwise an aqueous solution, 8 N in chromium trioxide and 8 N in sulfuric acid, until an excess of the oxidant is present. The reaction mixture is allowed to stand for about 15 minutes, then is treated successively with 0.1 part of isopropyl alcohol and about 50 parts of water. Evaporation of the organic solvents at reduced pressure results in crystallization of the product, which is collected by filtration and recrystallized from isopropyl ether to afford pure 17β-cyclohexanecarbonyloxy-6-oxa-5β-androstane-3,7-dione, M.P. about 174.5–176.5°. Infrared maxima are observed at about 5.73, 5.79, 7.99, and 8.52 microns.

Example 10

A solution of 3 parts of 3β-acetoxy-17β-benzoyloxy-6-oxa-5β-androstan-7β-ol and one part of p-toluenesulfonic acid monohydrate in 240 parts of methanol is stored at room temperature for about 16 hours, then is neutralized by the addition of solid potassium hydroxide. Dilution of the mixture with water results in precipitation of the product, which is collected by filtration and adsorbed on silica gel. Elution with 10% ethyl acetate in benzene followed by recrystallization from acetone-petroleum ether affords the hemi-acetonate of 17β-benzoyloxy-7β-methoxy-6-oxa-5β-androstan-3β-ol, M.P. about 187.5–189.5° with softening and resolidification at 160–170°. This compound is further characterized by infrared maxima at about 2.74, 5.81, 7.77, 8.91, and 9.58 microns.

Example 11

To a solution of 9 parts of 17β-benzoyloxy-7β-methoxy-6-oxa-5β-androstan-3β-ol hemi-acetonate in 300 parts of pyridine is added a mixture of 9 parts of chromium trioxide with 200 parts of pyridine, and this reaction mixture is stored at room temperature for about 16 hours, then diluted with ethyl acetate and filtered to remove the insoluble material. The organic filtrate is evaporated to dryness in vacuo and the residue is crystallized from isopropyl ether to yield 17β-benzoyloxy-7β-methoxy-6-oxa-5β-androstan-3-one, M.P. about 173–181°. Infrared maxima are observed at about 5.81, 7.79, and 8.92 microns.

Example 12

To a suspension of 9 parts of 3β-acetoxy-17β-benzoyloxy-6-oxa-5β-androstan-7β-ol in 800 parts of methanol is added a solution of 1.1 parts of potassium hydroxide in 240 parts of methanol, and the mixture is heated at 40° until homogeneity is achieved, then stored at room temperature for about 24 hours. Dilution with water effects precipitation of the solid product, which is collected by filtration and crystallized from acetone-petroleum ether to yield 17β-benzoyloxy-6-oxa-5β-androstane-3β,7β-diol, M.P. about 201–203°. This substance exhibits infrared maxima at about 2.75, 2.97, 5.81, 7.78, 9.37, and 9.69 microns.

Example 13

A mixture of 1.5 parts of 3β-acetoxy-17β-benzoyloxy-6-oxa-5α-androstan-7β-ol, 10 parts of acetic anhydride and 20 parts of pyridine is allowed to stand at room temperature for about 7 hours, then is diluted with water. The precipitated solid is collected by filtration, washed with water, and dried to afford 17β-benzoyloxy-6-oxa-5α-androstane-3β,7β-diol 3,7-diacetate, which is characterized by infrared maxima at about 5.72, 5.81, 7.81, and 8.05 microns.

Pyrolysis of the latter diacetate by heating at 220° and 0.1 millimeter of mercury pressure followed by sublimation of the product results in 17β-benzoyloxy-6-oxa-5α-androst-7-en-3β-ol 3-acetate, M.P. about 175–183°. Infrared maxima are observed at about 3.25, 5.80, 5.85, and 6.04 microns.

Example 14

A solution of 4 parts of 3β-acetoxy-17β-benzoyloxy-6-oxa-5α-androstan-7β-ol and 0.2 part of p-toluenesulfonic acid monohydrate in 120 parts of methanol is stored at room temperature for about 20 hours, then treated dropwise with a dilute methanolic potassium hydroxide solution to the phenolphthalein end point. The mixture is treated further with 0.56 part of potassium hydroxide dissolved in 4 parts of methanol, then is allowed to stand for about 16 hours at room temperature. Dilution with water followed by distillation of the methanol in vacuo and decantation of the aqueous layer affords a solid, which is crystallized from ether to yield 17β-benzoyloxy-7β-methoxy-6-oxa-5α-androstan-3β-ol, which is further characterized by infrared maxima at about 2.73, 5.81, 7.78, 8.91, and 9.58 microns.

Example 15

A mixture of one part of 17β-benzoyloxy-7β-methoxy-6-oxa-5α-androstan-3β-ol, 10 parts of acetic anhydride, and 20 parts of pyridine is stored at room temperature for about 15 hours, then poured slowly into water. The resulting precipitate is collected by filtration, then recrystallized first from aqueous methanol then from petroleum ether to produce 17β-benzoyloxy-7β-methoxy-6-oxa-5α-androstan-3β-ol 3-acetate, M.P. about 147–147.5°. This substance is further characterized by maxima in its infrared absorption spectrum at about 5.76, 5.81, 7.78, 7.90, 8.78, 8.90, and 9.60 microns.

Example 16

A solution of 5 parts of 3β-acetoxy-17β-benzoyloxy-6-oxa-5α-androstan-7β-ol in 200 parts of acetone is treated with an aqueous solution, 8 N in chromium trioxide and 8 N in sulfuric acid, until an excess of the oxidizing agent is present. Approximately 20 minutes later, the mixture is treated successively with 0.5 part of isopropyl alcohol and water, then distilled in vacuo to remove the organic solvents. The resulting precipitated product is collected by filtration and crystallized from methanol to afford 3β-acetoxy - 17β-benzoyloxy-6-oxa-5α-androstan-7-one, M.P. about 186–189.5°. Further recrystallization from methanol results in a pure sample, which displays a double melting point at about 190° and 220–221°; [α]$_D$= +15.5°. Infrared maxima are observed at about 5.77, 7.79, 7.95, 8.91, and 9.72 microns.

Example 17

To a solution of 4 parts of 3β-acetoxy-17β-benzoyloxy-6-oxa-5α-androstan-7-one in 280 parts of ethanol is added a solution of 0.56 part of potassium hydroxide in 10 parts of water, and this reaction mixture is stored at room temperature for about 16 hours, then diluted with water. The resulting precipitate is collected by filtration and crystallized from acetone to produce 17β-benzoyloxy-3β-hydroxy-6-oxa-5α-androstan-7-one, M.P. about 277–278°. This compound exhibits infrared maxima at about 3.09, 5.73, 5.81, 7.81, 8.50, 9.00, and 9.80 microns.

Example 18

To a solution of 2 parts of 17β-benzoyloxy-3β-hydroxy-6-oxa-5α-androstan-7-one in 100 parts of acetone is added dropwise an aqueous oxidizing solution, 8 N in chromium trioxide and 8 N in sulfuric acid, until an excess of the oxidant is present. The reaction mixture is allowed to stand for several minutes, then is diluted with water and distilled to remove the organic solvents. The precipitate which forms is collected by filtration and crystallized twice from acetone-isopropyl ether to afford pure 17β-benzoyloxy-6-oxa-5α-androstan-3,7-dione, M.P. about 269–273°. It exhibits infrared maxima at about 5.79, 7.80, 8.49, 8.90, and 9.51 microns.

Example 19

A mixture of one part of 17β-benzoyloxy-3β-hydroxy-6-oxa-5α-androstan-7-one, 1.5 parts of platinum oxide, and 200 parts of ethanol is shaken in a hydrogen atmosphere at one atmosphere pressure until no further pressure drop is observed. The catalyst is removed by filtration, and the filtrate is diluted with water, then extracted with benzene. The organic layer is washed successively with water and aqueous sodium bicarbonate, then evaporated to dryness and the resulting residue is crystallized from acetone-isopropyl ether to yield pure 17β-cyclohexanecarbonyloxy-3β-hydroxy-6-oxa-5α-androstan-7-one, M.P. about 219–227°. It displays infrared maxima at about 2.74, 5.81, 7.79, 8.49, and 8.91 microns.

Example 20

A solution of 6.5 parts of 17β-benzoyloxy-6-oxa-5α-androstane-3β,7β-diol in 1,000 parts of methanol is treated with one part of 60% perchloric acid, and the resulting mixture is stored at room temperature for about 16 hours. To this mixture is then added a slurry of 7 parts of platinum oxide in 80 parts of methanol and the hydrogenation is conducted at one atmosphere pressure until no further uptake of hydrogen is observed. Filtration of the reaction mixture to remove the catalyst affords a solution, which is neutralized by the addition of solid potassium hydroxide, then diluted with water. Distillation in vacuo removes the methanol, and the resulting precipitate is collected by filtration, then recrystallized from acetone-isopropyl ether to yield pure 17β-cyclohexanecarbonyloxy-7β-methoxy-6-oxa-5α-androstan-3β-ol, M.P. about 182–185°.

Example 21

To a solution of 2.5 parts of 17β-cyclohexanecarbonyloxy-7β-methoxy-6-oxa-5α-androstan-3β-ol in 200 parts of dioxane is added a solution of 3 parts of concentrated hydrochloric acid in 50 parts of water, and this reaction mixture is heated on the steam bath for about 40 minutes, then diluted with water and filtered to obtain the precipitated product. Recrystallization of the filtered solid from acetone-petroleum ether affords pure 17β-cyclohexanecarbonyloxy-6-oxa-5α-androstane-3β,7β-diol, M.P. about 186–190°. This substance is characterized by infrared absorption maxima at about 2.74, 5.79, 7.98, 8.80, and 9.53 microns.

Example 22

A solution of one part of 17β-cyclohexanecarbonyloxy-6-oxa-5α-androstane-3β,7β-diol in 320 parts of acetone is treated dropwise with an oxidizing medium consisting of an aqueous solution, 8 N in chromium trioxide and 8 N in sulfuric acid, until excess oxidant is present. The reaction mixture is allowed to stand at room temperature for about 20 minutes, then treated successively with isopropyl alcohol, to destroy the unreacted oxidizing agent, and water. The resulting precipitate is collected by filtration and crystallized from acetone-isopropyl ether to yield pure 17β-cyclohexanecarbonyloxy-6-oxa-5α-androstane-3,7-dione, M.P. about 221.5–225.5°. Infrared maxima are observed at about 5.78, 8.49, and 9.50 microns.

Example 23

A solution of one part of 17β-benzoyloxy-6-oxa-5α-androstane-3β,7β-diol in 40 parts of methanol is treated with 5 parts of 5% aqueous potassium hydroxide, and the resulting mixture is heated at reflux for about 18 hours, then cooled and stripped of methanol at reduced pressure. The product which precipitates is collected by filtration and crystallized from acetone to yield 6-oxa-5α-androstane-3β,7β,17β-triol, M.P. about 195–210°.

Example 24

A solution of 8 parts of 6-oxa-5α-androstane-3β,7β,17β-triol in 400 parts of acetone is treated by dropwise addition with an aqueous oxidizing solution, 8 N in chromium trioxide and 8 N in sulfuric acid, until excess oxidant is present. After approximately 30 minutes, a small quantity of isopropyl alcohol and water are successively added, and the organic solvents are removed by distillation in vacuo. The resulting solid is collected by filtration and recrystallized from acetone to yield 6-oxa-5α-androstane-3,7,17-trione, M.P. about 267–278° (dec.). It displays characteristic infrared maxima at about 5.73–5.78, 8.47, and 9.47 microns.

Example 25

A solution of 10 parts of chromium trioxide in 150 parts of pyridine is added to a solution of 7 parts of 17β-benzoyloxy-7β-methoxy-6-oxa-5α-androstan-3β-ol in 220 parts of pyridine, and this mixture is allowed to stand at room temperature for about 16 hours, then diluted with ethyl acetate and filtered. The ethyl acetate solution is evaporated to dryness, and the residue is crystallized from acetone-isopropyl ether to afford 17β-benzoyloxy-7β-methoxy-6-oxa-5α-androstan-3-one, M.P. about 190–192°. Recrystallization from acetone-isopropyl ether affords a pure sample, M.P. 199.5–202°, which exhibits maxima in the infrared at about 7.79, 7.80, 8.92, and 9.53 microns.

Example 26

To a solution of 2.39 parts of 17β-benzoyloxy-7β-methoxy-6-oxa-5α-androstan-3-one in 160 parts of methanol is added 50 parts of 10% aqueous potassium hydroxide, and the mixture is heated at reflux for about 4½ hours, then cooled and extracted with methylene chloride. The organic layer is washed with water and concentrated to dryness in vacuo, and the resulting residue is crystallized from acetone-isopropyl ether to afford 17β-hydroxy-7β-methoxy-6-oxa-5α-androstan-3-one, M.P. about 193–195.5°. Infrared maxima are observed at about 2.76, 5.81, and 9.58 microns.

Example 27

A solution of 13.5 parts of sodium borohydride in 280 parts of ethanol is added to a solution of 9.1 parts of methyl 17β-benzoyloxy-5-oxo-5,7-seco-B-norandrost-3-en-7-oate in 600 parts of ethanol, and the reaction mixture is stored at room temperature for about 4 hours, then treated successively with acetic acid and water. Distillation in vacuo removes the ethanol, and the remaining aqueous mixture is extracted with benzene. The organic layer is dried over anhydrous sodium sulfate, then evaporated to dryness at reduced pressure, and the residue is dissolved in 400 parts of methanol. This methanolic solution is treated with a solution of 25 parts of potassium hydroxide in 100 parts of water, then heated at reflux for about 5½ hours, cooled, and diluted with water. Extraction with ethyl acetate affords an organic solution, which is washed with water, dried over anhydrous sodium sulfate, and evaporated to dryness in vacuo. The residual product is purified by crystallization from acetone to yield pure 6-oxa-5α-androstane-7β,17β-diol, M.P. about 215.5–216.5°.

Example 28

An aqueous solution, 8 N in chromium trioxide and 8 N in sulfuric acid, is added dropwise to a solution of 5 parts of 6-oxa-5α-androstane-7β,17β-diol in 400 parts of acetone until the oxidant is present in excess amount. This reaction mixture is allowed to stand for approximately 20 minutes, then treated successively with 0.5 part of isopropyl alcohol and water. The organic solvents are removed by distillation in vacuo and the resulting precipitate is collected by filtration, then crystallized from acetone to afford 6-oxa-5α-androstane-7,17-dione, M.P. about 270–272°; [α]_D = +34°. This compound exhibits maxima in the infrared at about 5.73, 8.42, 9.27, and 9.59 microns.

Example 29

A solution containing 3.1 parts of 6-oxa-5α-androstane-7β,17β-diol and 0.3 part of p-toluenesulfonic acid monohydrate in 280 parts of methanol is stored at room temperature for about 18 hours, then neutralized with solid potassium hydroxide, diluted with water, and extracted with ether. The organic extract is washed with water, dried over anhydrous sodium sulfate, and concentrated to dryness in vacuo. Recrystallization of the residue from acetone-petroleum ether produces 7β-methoxy-6-oxa-5α-androstan-17β-ol, M.P. about 157–159°. A second recrystallization from acetone-petroleum ether affords a pure sample, M.P. 163–164°, which exhibits infrared maxima at about 2.73, 8.81, 9.60, and 10.09 microns.

Example 30

To a solution of 6 parts of 7β-methoxy-6-oxa-5α-androstan-17β-ol in 200 parts of pyridine is added 6 parts of benzoyl chloride, and this mixture is allowed to stand at room temperature for about 17½ hours, then diluted with water. The resulting precipitate is collected by filtration, and recrystallized from hexane to yield 7β-methoxy-6-oxa-5α-androstan-17β-ol 17-benzoate, M.P. about 169–172°.

Example 31

To a solution of 1.2 parts of methyl 17β-benzoyloxy-5-oxo-5,7-seco-B-norandrostan-7-oate in 150 parts of tetrahydrofuran is added one part of lithium aluminum hydride, and the reaction mixture is heated at reflux for about 24 hours. The excess reducing agent is destroyed by the cautious addition of ethyl acetate followed by approximately 2 volumes of dilute hydrochloric acid. Distillation in vacuo removes the organic solvents, and the resulting aqueous slurry is extracted with chloroform. Concentration of the extract in vacuo affords a residue, which is crystallized from ethyl acetate to afford pure 5,7-seco-B-norandrostane-5,7,17β-triol, M.P. about 235–236°.

Example 32

An equivalent quantity of 5,7-seco-B-norandrostane-5,7,17β-triol is treated with chromic acid according to the procedure of Example 6. The diluted reaction mixture is extracted with ethyl acetate, and the organic layer is washed with aqueous saturated sodium chloride, dried over anhydrous sodium sulfate, and concentrated to an oil, which is chromatographed on silica gel and eluted with 5% ethyl acetate in benzene, then recrystallized from isopropyl ether to yield pure 6-oxa-5β-androstane-7,17-dione, identical with the product of Example 6.

Example 33

The substitution of an equivalent quantity of methyl 17β-benzoyloxy-5-oxo-5,7-seco-B-norandrost-3-en-7-oate in the process of Example 4 results in 17β-benzoyloxy-6-oxa-5β-androstan-7-one, identical with the product of Example 4.

Example 34

A solution of 2 parts of sodium borohydride in 80 parts of ethanol is added to a solution of 4 parts of methyl 17β-benzoyloxy-5-oxo-5,7-seco-B-norandrostan-7-oate in 450 parts of ethanol, and the resulting mixture is allowed to stand at room temperature for about 6 hours, then treated with acetic acid to destroy the unreacted reducing agent. Concentration in vacuo to a small volume results in precipitation of the product, which is collected by filtration, washed with water, and recrystallized from methanol to afford 17β-benzoyloxy-6-oxa-5β-androstan-7-one, identical with the product of Example 4.

*Example 35*

A mixture of one part of 17β-benzoyloxy-6-oxa-5α-androstane-3β,7β-diol, 15 parts of propionic anhydride, and 20 parts of pyridine is allowed to stand at room temperature for about 16 hours, then diluted with water, and extracted with benzene. The organic layer is washed with water, dried over anhydrous sodium sulfate, and concentrated to dryness to afford 17β-benzoyloxy-6-oxa-5α-androstane-3β,7β-diol 3,7-dipropionate.

*Example 36*

To a solution of one part of 3β-acetoxy-17β-benzoyloxy-6-oxa-5α-androstan-7β-ol in 100 parts of methanol is added 3 parts of p-toluenesulfonic acid monohydrate, and the resulting mixture is stored at room temperature for about 24 hours. This reaction mixture is treated with a solution of 20 parts of sodium hydroxide and 30 parts of water, then is heated at reflux for about 5 hours, cooled, diluted with water, and extracted with methylene chloride. Concentration of this organic extract to dryness in vacuo produces a residue, which is crystallized from isopropyl ether to afford pure 7β-methoxy-6-oxa-5α-androstane-3β,17β-diol, M.P. about 124–130°.

*Example 37*

By substituting an equivalent quantity of ethanol and otherwise proceeding according to the process of Example 36, 7β-ethoxy-6-oxa-5α-androstane-3β,17β-diol is obtained.

*Example 38*

The substitution of an equivalent quantity of ethanol in the procedure of Example 29 results in 7β-ethoxy-6-oxa-5α-androstan-17β-ol.

*Example 39*

The substitution of equivalent quantities of propionic anhydride and sodium propionate in the process of Example 7 affords 17β-propionoxy-6-oxaandrost-4-en-7-one.

What is claimed is:
1. A compound of the formula

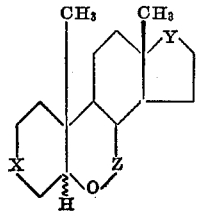

wherein X is selected from the group of radicals consisting of carbonyl, β-hydroxymethylene, and β-(lower alkanoyl)oxymethylene; Y is selected from the group of radicals consisting of carbonyl, β-hydroxymethylene, β-benzoyloxymethylene, and β - cyclohexanecarbonyloxymethylene; and Z is selected from the group of radicals consisting of carbonyl, β-hydroxymethylene, β-(lower alkanoyl)oxymethylene, and β-(lower alkoxy)methylene.

2. 3β - acetoxy - 17β-benzoyloxy-6-oxa-5α-androstan-7β-ol.
3. 3β - acetoxy - 17β-benzoyloxy-6-oxa-5β-androstan-7-one.
4. 17β - hydroxy - 7β - methoxy-6-oxa-5α-androstan-3-one.
5. 17β-benzoyloxy-6-oxa-5α-androstane-3,7-dione.
6. 17β - benzoyloxy - 3β-hydroxy-6-oxa-5α-androstan-7-one.
7. A compound of the formula

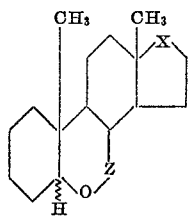

wherein X is selected from the group of radicals consisting of carbonyl, β-hydroxymethylene, and β-benzoyloxymethylene, and Z is selected from the group of radicals consisting of carbonyl, β-hydroxymethylene, and β-(lower alkoxy)methylene.

8. 17β-benzoyloxy-6-oxa-5β-androstan-7-one.
9. 17β-hydroxy-6-oxa-5β-androstan-7-one.
10. 17β-benzoyloxy-6-oxa-5α-androstan-7β-ol.
11. 6-oxa-5β-androstane-7,17-dione.
12. 6-oxa-5α-androstane-7β,17β-diol.
13. 7β-methoxy-6-oxa-5α-androstan-17β-ol.
14. A compound of the formula

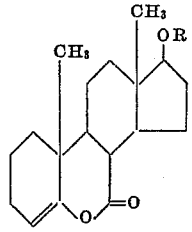

wherein R is lower alkanoyl.
15. 17β-acetoxy-6-oxaandrost-4-en-7-one.

No references cited.